United States Patent [19]
Albert

[11] Patent Number: 4,838,369
[45] Date of Patent: Jun. 13, 1989

[54] LOAD CELL HAVING DIGITAL OUTPUT

[75] Inventor: William C. Albert, Boonton, N.J.

[73] Assignee: Crystal Gage Inc., Franklin Lakes, N.J.

[21] Appl. No.: 241,029

[22] Filed: Sep. 2, 1988

[51] Int. Cl.$^4$ .................. G01G 3/14; G01G 3/08; G01L 1/10

[52] U.S. Cl. .................. 177/210 FP; 177/229; 73/862.59

[58] Field of Search .................. 177/210 FP, 229; 73/862.41, 862.59

[56] References Cited

U.S. PATENT DOCUMENTS

| | | | |
|---|---|---|---|
| 4,526,247 | 7/1985 | EerNisse et al. | 177/210 FP |
| 4,587,853 | 5/1986 | Komoto et al. | 177/210 FP |
| 4,623,813 | 11/1986 | Naito et al. | 177/210 FP |
| 4,743,790 | 5/1988 | Albert . | |
| 4,751,849 | 6/1988 | Paros et al. | 73/862.59 |

Primary Examiner—George H. Miller, Jr.
Attorney, Agent, or Firm—Brumbaugh, Graves, Donohue & Raymond

[57] ABSTRACT

Apparatus for measuring force, useful in a weighing scale for example, includes a parallelogram-like load cell structure that deflects in response to application of the force to be measured, and a pair of force-sensitive crystal resonators, attached to cantilever sensor beams forming part of the structure for sensing the deflection of the load cell structure. The two resonators are attached to the sensor beams such as to be placed in tension and compression, respectively, upon deflection of the structure and thereby cause their vibration frequency to increase and decrease, respectively, with increases in applied force. The difference between the two frequencies, which varies substantially linearly with changes in applied force and is inherently digital in nature, is used as a measure of the force applied to the load cell structure.

10 Claims, 3 Drawing Sheets

LOAD CELL HAVING DIGITAL OUTPUT

BACKGROUND OF THE INVENTION

This invention relates generally to apparatus for accurately measuring forces or weights and, more particularly, to a load cell utilizing a force-sensitive vibrating beam resonator for sensing the strain induced in the load cell structure by an applied force.

Conventional load cells used to measure forces or weights of the kind used in weighing scales, for example, employ strain gages or other strain-sensing means such as a variable capacitor, a variable inductance, or optical means for sensing the strain induced in the load cell structure by the applied force. Among the disadvantages of such known load cells is their inherently analog output which requires an analog-to-digital (A/D) conversion to make the load cell compatible with digital electronics which conversion, in turn, causes an additional loss of accuracy and increased cost of manufacture. Additionally, because of the plastic behavior of the epoxy currently used to bond the strain gage to the straining portion of the load cell, creep and hysterisis errors are introduced. Also, the relatively high strain and attendant high stress levels required for strain gages to function properly further contributes to creep and hysterisis errors.

A primary object of the present invention is to provide an improved load cell that overcomes the foregoing disadvantages of currently available load cells.

A more specific object of the invention is to provide a load cell utilizing a crystal resonator in a strain-sensing configuration that directly produces a digital output signal, that has high resolution and accuracy, has a low sensitivity to temperature and exhibits low hysterisis and creep errors.

SUMMARY OF THE INVENTION

Briefly, the load cell according to the invention includes a planar member, typically formed of metal, having a first support portion to which the force to be measured is applied and two fixed-fixed load beams joining the first support portion to a second support portion to form a parallelogram-like structure which exhibits relatively large deflection under full load. Two cantilever sensor beams, both attached at one end to one support portion, extend generally parallel to and spaced from a respective load beam toward the other support portion. The strain caused by the deflection of the load cell mechanism is sensed by a pair of force-sensitive vibrating beam resonators each attached at one end to the free end of a respective sensor beam and attached at their other end to the other support portion. The deflection of the sensor beams caused by the applied load places one of the resonators in tension and the other in compression, causing their vibration frequencies to increase and decrease, respectively, each according to a non-linear function such that the difference between them is substantially linearly related to changes in the force applied to the load cell. The signals representative of the frequency change of the individual resonators, and of the difference frequency, are inherently digital in nature and therefore amenable to processing without A/D conversion with electronic digital signal processing techniques, to provide a highly accurate measure of the applied force.

Other objects, features and advantages of the invention, and a better understanding of its construction and operation, will be had from the following detailed description read in conjunction with the accompanying drawings.

DESCRIPTION OF EXEMPLARY EMBODIMENTS

Figure 1:
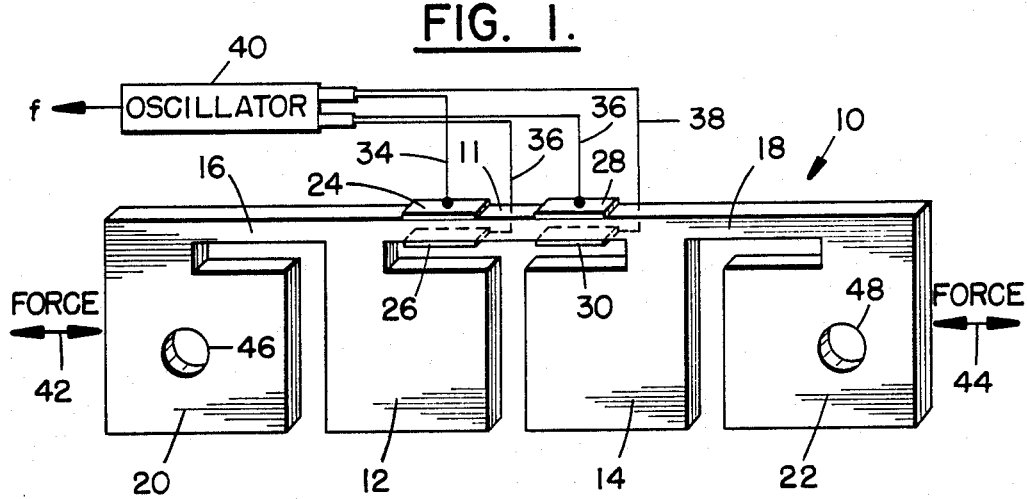
FIG. 1 is a perspective view of a vibrating beam resonator particularly adapted for use in the improved load cell.

The load cell according to the invention utilizes a known vibrating beam resonator for sensing the strain caused by a force applied to the cell, such as the resonator described in applicant's U.S. Pat. No. 4,743,790, a preferred embodiment of which is shown, greatly enlarged, in FIG. 1. The vibrating beam resonator 10, cut from a generally rectangular quartz crystal, or other suitable piezoelectric material blank, includes a vibratory beam 11, isolator masses 12 and 14 at each end and at one side of the vibratory beam, isolator springs 16 and 18 extending from the isolator masses, and mounts 20 and 22 at the ends of the isolator springs. Typically, the vibrating beam resonator is fabricated from a quartz crystal blank 0.90 inch long, 0.25 inch wide and 0.02 inch thick. The described elements of the resonator are defined by cutting slots in the blank, typically 0.02 inch wide for a blank having the above dimensions.

Suitable electrodes 24 and 26 affixed to the top and bottom surfaces of the left hand portion of the beam 11 and electrodes 28 and 30 affixed to the top and bottom surfaces, respectively, of the right hand portion of the beam are connected by suitable leads 34–38 to the input terminals of an electronic oscillator 40. Typically, and as is well known in the art, the electrodes are plated on the beam. The beam 11 is thin and flexible, typically having a thickness on the order of 0.012 inch, and vibrates in a known flexure mode which is maintained by the combined action of the piezo-electric behavior of the quartz and the oscillator circuit, similar to that utilized in quartz wrist watches.

The arrows 42 and 44 at the outer extremities of mounts 20 and 22, respectively, indicate that a force, either tension or compression, may be axially applied to either end of beam 11; in all cases, the applied force causes the vibration frequency of the beam to change which, in turn, correspondingly changes the frequency f of oscillator 40, thereby to provide a measure of the magnitude of the applied force. The mounts 20 and 22 have respective openings 46 and 48 therethrough to facilitate mechanical attachment of the resonator to the load cell structure. Typically, for the present load cell application the resonator is dimensioned to have a nominal no-load vibration frequency of 20 kHz, which increases about 2 kHz full scale when subjected to an axial load in tension and decreases about 2 kHz full scale in response to an axially applied compressive load.

Figure 2:
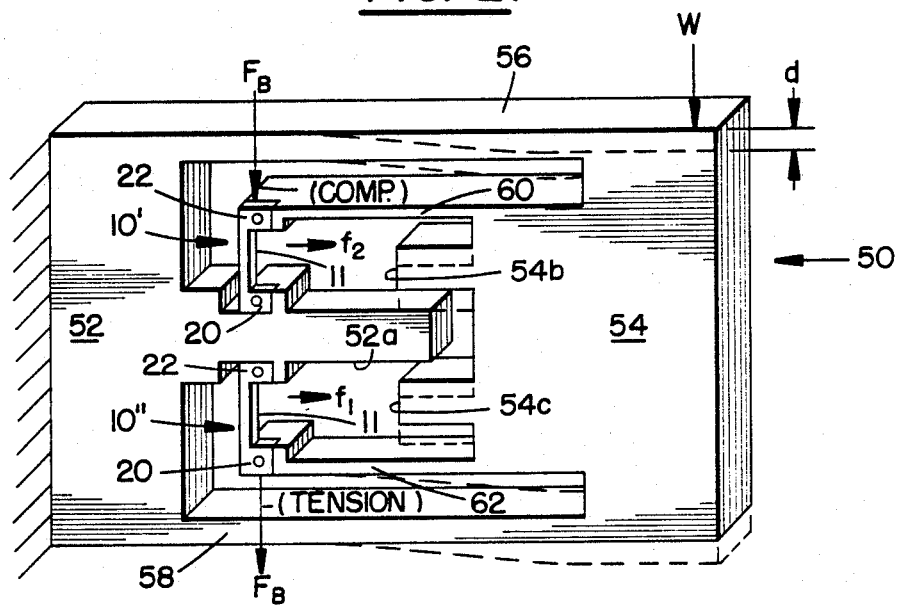
FIG. 2 is a perspective view of one embodiment of a load cell constructed in accordance with the invention.

The load cell structure according to a first embodiment of the invention, illustrated in FIG. 2, includes a generally rectangular, planar member 50 which may be formed of metal, such as aluminum, portions of which are cut away, as by milling, to define a parallelogram-like structure including a fixed support portion 52 and a moving support portion 54 joined together by two fixed-fixed load beams 56 and 58. Typically, the member 50 may be four inches long, two and one half inches wide and one inch thick. The fixed support portion is adapted to be rigidly supported on associated structure, such as a supporting member incorporated in a weighing scale, and the force W to be measured is applied to the upper edge of the moving support portion 54. The parallelogram mechanism is designed to exhibit a relatively large deflection d under full load W; for example, in a load cell made of aluminum and having the dimensions noted above, the outer extremity of moving support portion 54 may deflect 0.015 inch in response to a full load W of 50 pounds.

The cutouts in planar member 50 additionally define first and second cantilever sensor beams 60 and 62 each integrally attached at one end to moving support portion 54 and extending generally parallel to and spaced from load beams 56 and 58, respectively, toward the fixed support portion 52. The free end of beam 60 is mechanically attached to one end of a resonator 10', preferably having the construction illustrated in FIG. 1, by a metal screw, for example, extending through the opening 48 in its mount 22, and the free end of sensor beam 62 is similarly attached to one end of a second resonator 10'', except that in this case mount 20 is attached to the beam. The mounts 20 and 22 at the other end of resonators 10' and 10'', respectively, are similarly mechanically attached, by a metal screw, for example, to the fixed support portion 52, more particularly to projections formed on an extension 52a of the fixed support portion. Alternatively, the resonators may be attached to the load cell structure by suitable clamping means, or a combination of clamps and screws. The extension 52a, having a rectangular cross-section, extends partially into a cutout 54a formed in the moving support portion 54, and is interleaved between and equidistant from a pair of similar extensions 54b and 54c which extend inwardly from moving support portion 54; the extension 54b together with extension 52a serves as a stop for limiting the loaded deflection of the parallelogram-like mechanism.

Sensor beams 60 and 62 have a smaller cross-section than the load beams, and are designed and dimensioned so that the full load deflection d will subject the resonators 10' and 10'' to a full load force FB which, for the typical dimensions noted above, is 1.5 pounds. The resonators 10' and 10'' (which in the interest of clarity are shown in FIG. 2 as consisting only of a vibratory beam 11 and a pair of mounts) being very stiff, exhibit a negligibly small axial deflection compared to the deflection d of the parallelogram-like mechanism. By virtue of the parallelogram-like mechanism and attachment of the cantilever sensor beams to the moving support portion 54, a deflection d of the moving support portion in response to an applied load W places the vibratory beam of resonator 10'' in tension and the beam of resonator 10' in compression, the significance of which will soon become apparent.

Figure 3:
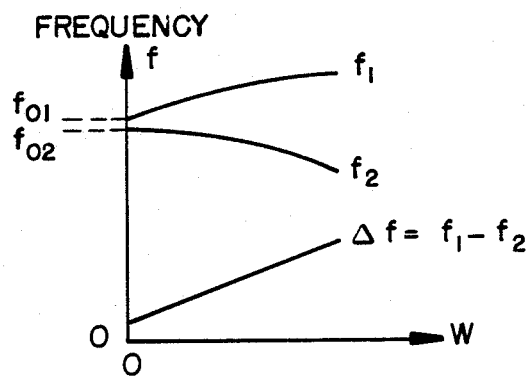
FIG. 3 is a set of curves illustrating the relationship between the load applied to the load cell and the vibrating frequencies of the resonators embodied in the structure shown in FIG. 2.

Absent an applied load W the vibratory beam of each of the two resonators vibrates at its respective no-load bias frequency, which may be, but not necessarily, the same. When the applied load W is increased to a full scale load of 50 pounds, for example, the deflection d reaches its maximum of 0.015 inch and the force $F_B$ exerted on vibrating beam resonators 10' and 10'', compression and tension, respectively, reaches 1.5 pounds. The frequency of vibration of the beam in tension increases and the frequency of vibration of the beam in compression decreases with increased load according to the non-linear functions illustrated in FIG. 3, where $f_{01}$ and $f_{02}$ are the no-load bias frequencies of resonators 10'' and 10', respectively. Thus, the frequency change exhibited by either of resonators 10' and 10'' provides a measure of the applied force W, suggesting that one of the resonators could be dispensed with and, indeed, this is a viable alternative in applications not requiring great precision. However, as will be seen, by using two vibrating beam resonators in the described push-pull configuration and utilizing the frequency difference between the two resonators as a measure of the applied force, which as seen in FIG. 3, are substantially linearly related, it is possible to determine the magnitude of the force to a high degree of accuracy and resolution.

The frequency-force relationships for the individual resonators (10'' in tension and 10' in compression), and for the difference frequency, are described in the following Equations 1, 2 and 3, wherein $f_0$ is the bias frequency, $C_1$ is a coefficient representing first order frequency-force sensitivity, $C_2$ is a coefficient representing second order (non-linear) frequency-force sensitivity, and beam tension and beam compression are represented by $F_B$ and $-F_B$, respectively: the second subscript to each of the terms of the equations serve to distinguish the individual vibratory beams.

For beam 1 in tension $$f_1 = f_{01} + C_{11}F_B + C_{21}F_B^2 \quad \text{Eq. (1)}$$

For beam 2 in compression $$f_2 = f_{02} - C_{12}F_B + C_{22}F_B^2 \quad \text{Eq. (2)}$$

(The $C_{22}F_B^2$ term is positive because $(-F_B)^2$ is positive.)

Difference frequency $$\Delta f = f_1 - f_2 =$$

$$\underbrace{f_{01} - f_{02}}_{\text{(bias)}} + \underbrace{(C_{11} + C_{12})F_B}_{\text{(scale factor)}} + \underbrace{(C_{21} - C_{22})F_B^2}_{\text{(non-linearity)}}$$

Figure 4:
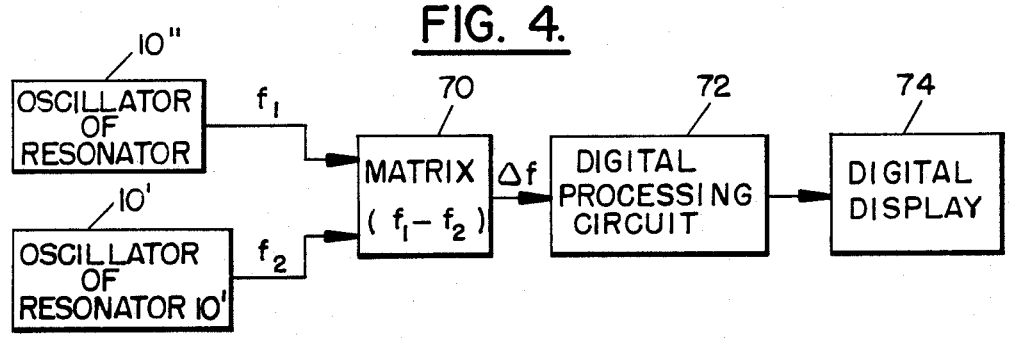
FIG. 4 is a block diagram of a circuit useful for processing signals developed in the load cell of FIG. 2.

As illustrated in FIG. 3, the frequency-force relationship of each of the two vibratory beams, one in tension and the other in compression, expressed in Equations 1 and 2, is inherently non-linear. However, the relationship between the difference frequency and applied force is substantially linear because, as is evident from Equation 3, the non-linear $C_2$ terms cancel; the linearity of this relationship simplifies the processing and display of the force representing signal to provide a suitable display, an important advantage of using the push-pull configuration of resonators. A suitable processing circuit, shown in block diagram in FIG. 4, includes a differencing matrix 70 for subtracting the frequency $f_2$ of resonator 10' (the one in compression) from the frequency $f_1$ of resonator 10'' (the one in tension) to produce a difference frequency signal $\Delta f$ which varies substantially linearly with applied force from a frequency of a few Hz (the difference, if any, between the bias frequencies of the two resonators) to about 4 kHz for resonators having the characteristics noted earlier. Because of the linearity of the function each unit of force is represented by a unique frequency which is readily converted by known digital processing circuitry 72, such as a microprocessor, to a digital signal for display on a suitable display device 74, which preferably is digital but which may be analog, if desired.

Use of the frequency difference between the two resonators has the additional advantage that the effect of temperature on the bias frequency $f_0$ of the resonators is cancelled. Since temperature changes will equally change the bias frequency $f_0$ of both resonator beams, the difference frequency is unaffected by temperature; this is demonstrated analytically by cancellation of the $f_0$ terms of Equation 3. A mechanism exists which also cancels any temperature effects associated with the metallic load cell structure 50 for the following reasons: Because the spring rate K of load beams 56 and 58 is very much greater than the spring rate k of sensing beams 60 and 62, and because the axial deflection of resonators 10' and 10'' is negligibly small compared to the deflection d, the following relationships obtain:

$$d = W/2K \text{ and } F_B = dk \qquad \text{Eq. (4) (5)}$$

When Equations 4 and 5 are combined, the following $F_B/W$ ratio is obtained.

$$F_B/W = k/2K \qquad \text{Eq. (6)}$$

Modifying Eq. (6) to include reference temperature values $K_0$ $k_0$ and $\Delta K/\Delta T$ and $\Delta k/\Delta T$ as their respective temperature sensitivities to temperature T, the following equation results:

$$F_B/W = \frac{k_0\left(1 + \frac{\Delta k}{\Delta K} T\right)}{K_0\left(1 + \frac{\Delta K}{\Delta T} T\right)} \qquad \text{Eq. (7)}$$

Since the sensor beams 60 and 62 and the load beams 56 and 58 are both flexure beams made of the same material, their dimensions and elastic properties, upon which their respective spring rates depend, will change equally with temperature so that $\Delta K/\Delta T = \Delta k/\Delta T$; therefore, when Equation 7 is differentiated with respect to temperature, the following relationship, which shows that the $F_B/W$ relationship is insensitive to temperature, is obtained $$\frac{\Delta(F_B/W)}{\Delta T} = 0 \qquad \text{Eq. (8)}$$

The described coupling of the very stiff resonators to the cantilever sensing beams of the parallelogram-like structure has the advantage that the resonators deflect negligibly compared to the relatively large deflection d of the parallelogram-like structure, making the system readily amenable to overload protection by including stops, such as the extensions 54b and 54c, in the design of the load cell; rather than the fixed stops shown in the FIG. 2, such overload protection stops may be adjustable.

An important attribute of the described load cell is that because the resonators act as deflection sensors, load beams 56 and 58 and sensor beams 60 and 62 can be designed to have a geometry that results in low strain for a given deflection with the attendant advantageous result of low hysterisis and creep, a serious deficiency of load cells that use strain gages. The organic epoxy conventionally used to bond the strain gage to a straining portion of the load cell does not behave purely elastically but, rather, exhibits some deformation which causes creep and hysterisis errors. In the present load cell, the quartz crystal of the resonator is a purely elastic material, and because it is mechanically attached to the load cell structure with a metallic screw and/or clamp arrangement, (i.e., no epoxy), there is little, if any, opportunity for creep and hysterisis errors.

Although the load cell with two resonators in a push-pull configuration is preferred for the reasons discussed, it is within the contemplation of the invention to provide a load cell utilizing a single resonator, either in tension or compression. As mentioned earlier, such a cell would be similar to the design shown in FIG. 2, differing therefrom essentially only in the elimination of one of the cantilever sensing beams and its associated resonator, or merely by elimination of one of the resonators. The elimination of one resonator and associated supporting structure would have the advantages of less complexity and lower manufacturing costs, but at the expense of inferior linearity and temperature stability compared to the two-resonator configuration.

Figure 5:
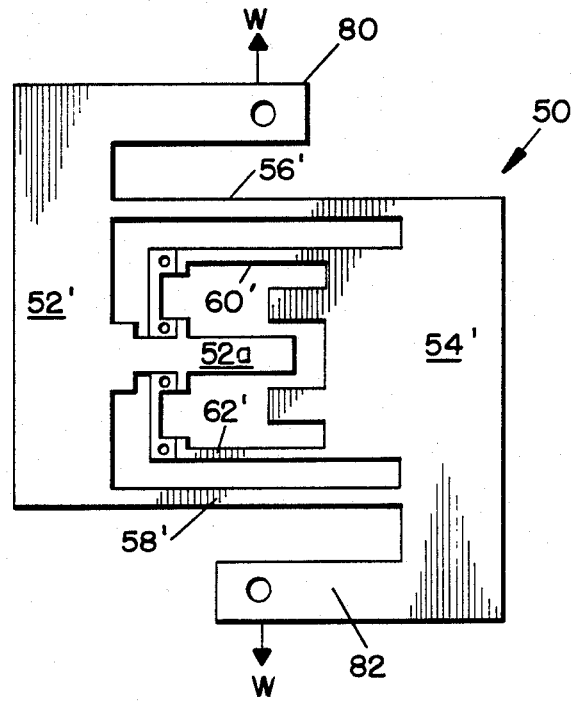
FIG. 5 is a plan view of an alternative construction of a load cell embodying the invention.

For in-line applications in which the load cell is to be used, for example to measure the tension (or compression) in a rod or cable, over-hanging structures such as illustrated at 80 and 82 in FIG. 5 can be added to load cell structure 50, which generally corresponds to the structure shown in FIG. 2. The essential differences in the FIG. 5 design are (1) the portion 52' is not rigidly supported but, rather, is subjected to a force (either tension or compression as indicated by the double-headed arrow marked W) applied to over-hang 80 and (2) instead of the force being applied to an edge of the moving support portion 54', it is applied to the integral over-hang structure 82. Otherwise, the design of FIG. 5 has the same parallelogram-like configuration of a pair of fixed-fixed load beams 56' and 58' attached to portions 52' and 54', cantilever sensor beams 60' and 62' each attached at one end to an end of a respective resonator, the other ends of which are secured to an extension 52a of portion 52'.

Figure 6:
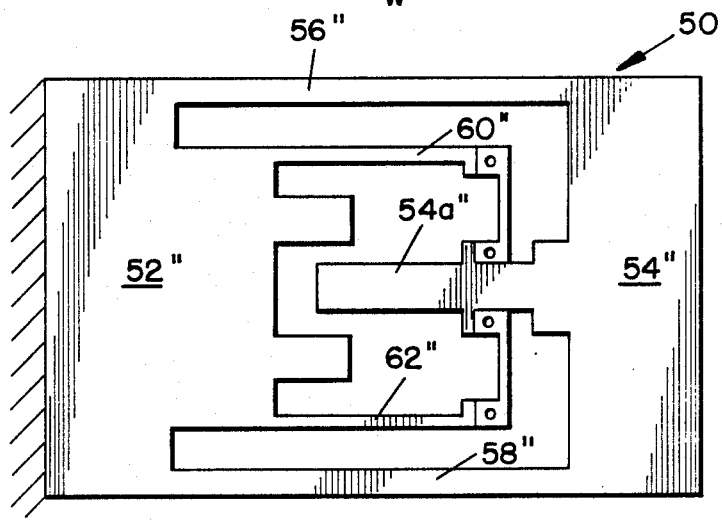
FIG. 6 is an elevation view of still another embodiment of a load cell according to the invention.

Whereas in the load cell illustrated in FIG. 2 the cantilever sensor beams are attached to the moving support 54, it is also within the contemplation of the invention to attach the sensor beams to the fixed support portion of the load cell structure as shown in FIG. 6. More particularly, in this alternative embodiment in which double-primed numerals are used to identify like numbered parts of the FIG. 2 configuration, a fixed support portion 52'' adapted to be secured to the structure of an associated weighing scale assembly, is attached to a moving support portion 54'' with a pair of load beams 56'' and 58''. Each of a pair of cantilever sensor beams 60" and 62" is attached at one end to fixed supporting portion 52" and extends toward the moving portion of the structure. The free end of each sensor beam is attached to one end of a respective resonator, the other end of each of which is secured to an extension 54a' of moving support portion 54". The operation of this arrangement, as well as of the arrangement shown in FIG. 5, is basically the same as that of FIG. 2, and preferably would utilize the circuit of FIG. 4 for displaying the applied force or weight.

Although the metal load cell structure 50 has been described as monolithic, it can, instead, be a multi-piece assembly; that is, the load beams, the fixed and moving supports and the cantilever sensor beams may all be separately fabricated pieces secured together as by welding, brazing, mechanical fasteners, and the like. There may be manufacturing advantages to this approach, particularly in mass production of the assembly.

Figure 7:
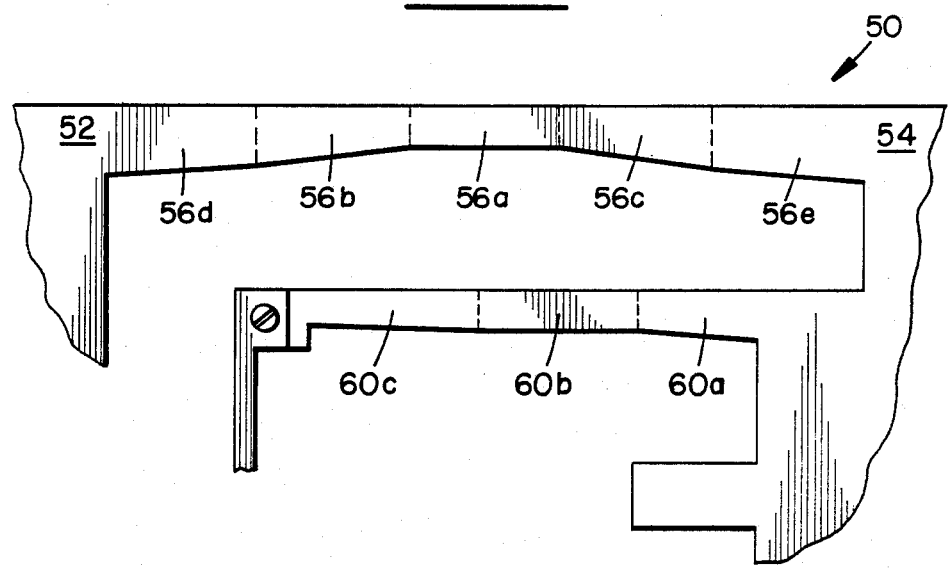
FIG. 7 is a fragmentary elevation view showing a modified construction of portions of the load cell illustrated in FIG. 2.

Also, although load beams 56 and 58 have been described as having a rectangular cross-section of constant area throughout their length, it may be desirable to have the cross-sectional area of the load beam vary along its length as shown in FIG. 7 for more even bending and stress distribution, thinnest at a central region 56a, somewhat thicker over equal-length regions 56b and 56c on either side of the central region, and thicker still over two equal length end regions 56d and 56e.

For similar reasons, the cantilever sensor beams, one of which is shown in FIG. 7, may also have a varying rectangular cross-sectional area; it may, for example, be uniformly tapered from a larger cross-section at the point of attachment to a support portion to a smaller cross-section at the free end, or it may be tapered in discrete steps as shown from a largest cross-section region 60a where it is attached to the moving portion 54, an intermediate region 60b having a somewhat smaller cross-sectional area, and a third, still smaller region 60c.

Figure 8:
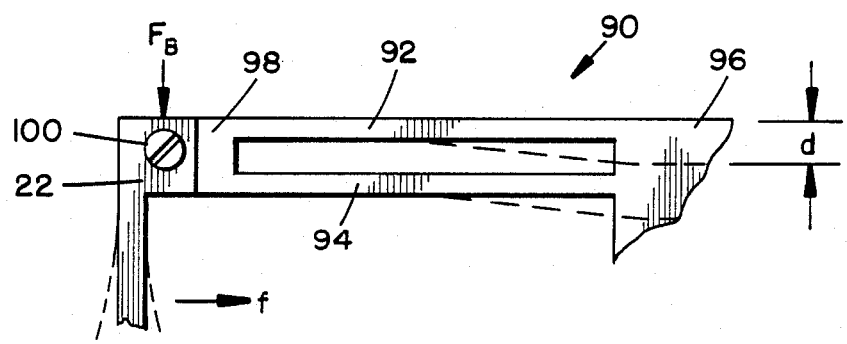
FIG. 8 is a fragmentary elevation view showing an alternative construction for the sensor beams of the load cell.

To prevent the vibratory beams of the resonators from bending when a load is applied to the load cell, which may be important in certain applications, the sensor beams, one of which is shown in the fragmentary view of FIG. 8, may take the form of a parallelogram consisting of two fixed fixed beams 92 and 94 both joined at one end to the support portion 96 of the load cell and connected together at the other end by a short beam section 98 to which one mount 22 of a resonator is mechanically secured, for example, by a screw 100. The beams 92 and 94 may each have a constant cross-sectional area throughout their length, or it may vary in the manner and for the reasons discussed in connection with FIG. 7.

While each of the disclosed embodiments of the load cell uses two load beams, each load beam may be replaced with two or more parallel load beams, having a construction similar to the sensor beam illustrated in FIG. 8, for increasing the load handling capacity of the load cell and lowering the stresses in the load beams.

While there has been described what are regarded to be preferred embodiments of the invention, those skilled in the art will recognize that other and further modifications may be made thereto without departing from the spirit of the invention, and it is intended to claim all such embodiments as fall within the true scope of the invention.

I claim:

1. Apparatus for measuring forces or weights comprising, in combination:

a load cell structure including first and second support portions, at least first and second fixed fixed load beams attached at their respective opposite ends to said first support portion and to said second support portion and with said support portions forming a parallelogram-like structure that is adapted to deflect in response to application of a force to one of said support portions, and at least one compliant cantilever sensor beam having one end attached to said one support portion and extending toward the other support portion and terminating at a free end; and at least one force-sensitive vibrating beam resonator having mounts at the ends thereof, one attached to the free end of said at least one compliant cantilever sensor beam and the other attached to said other support portion;

wherein the applied force to be measured is transferred by deflection of said parallelogram-like structure and said compliant cantilever sensor beam to said at least one resonator to cause the vibration frequency of said at least one resonator to vary with changes in applied force according to a predetermined relationship.

2. Apparatus according to claim 1, wherein said load cell structure has first and second compliant cantilever sensor beams both attached at one end to said one support portion and extending generally parallel to and spaced from a respective load beam toward said other support portion, and wherein one mount of a second vibrating beam resonator is attached to the free end of said second sensor beam and the other mount of said second resonator is attached to said other support portion, thereby causing one of said resonators to be placed in tension and the other to be placed in compression in response to the applied force and causing the frequency of said one resonator to increase and the frequency of said other resonator to decrease, and wherein said apparatus further comprises circuit means for measuring the difference between the vibration frequencies of said first and second resonators and producing an output signal that varies substantially linearly with changes in applied force.

3. Apparatus according to claim 1, wherein said load cell structure is a generally planar monolithic metal member.

4. Apparatus according to claim 3, wherein said load beams have a uniform cross-sectional area throughout their length.

5. Apparatus according to claim 3, wherein said load beams have a rectangular cross-section, the area of which varies along their length.

6. Apparatus according to claim 1, wherein said at least one cantilever sensor beam has the same cross-sectional area throughout its length.

7. Apparatus according to claim 1, wherein said at least one cantilever sensor beam has a generally rectangular cross-section, the area of which decreases from said one end toward its free end.

8. Apparatus for measuring force or weight comprising, in combination:

a parallelogram-like load cell structure including first and second support portions joined together by first and second generally parallel spaced apart fixed fixed load beams, and first and second compliant cantilever sensor beams each attached at one end to a first support portion and extending generally parallel to and spaced from a respective load beam toward said second support portion and terminating at a free end;

first and second force-sensitive resonators each having a vibratory beam with an integral mount at each end thereof;

means for attaching the mount at one end of each resonator to the free end of said first and second sensor beams, respectively, and means for attaching the mount at the other end of said resonators to said second support portion, said load cell structure being constructed and arranged to transfer a force applied to said first portion to said first and second resonators in tension and compression, respectively, for causing the vibration frequency of said first and second resonators to increase and decrease, respectively, with increases in the applied load; and circuit means coupled to said first and second resonators for measuring the difference between the vibration frequencies of said first and second resonators and producing an output signal that varies substantially linearly with changes in the applied force.

9. A resonator load cell comprising:

first and second generally parallel spaced apart load beams both supported at one end on a first support and joined together at the other end by a second support portion and forming a parallelogram-like structure;

first and second compliant cantilever sensor beams both attached to said second support portion and extending generally parallel to said first and second load beams, respectively, toward said first support and terminating at a free end, said structure being adapted to receive a force at a location spaced from said one end, thereby causing said load beams and said sensor beams to bend in proportion to the magnitude of said force; and first and second force-sensitive resonators each having first and second ends, one end of each resonator being attached to the free end of a respective sensor beam, and the other end of both resonators being attached to said first support, thereby causing one of said resonators to be placed in tension and the other to be placed in compression in response to bending of said sensor beams, and causing the vibration frequency of said one resonator to increase and the vibration frequency of said other resonator to decrease in proportion to the magnitude of said force.

10. A resonator load cell according to claim 9 and further comprising:

means coupled to said first and second resonators for measuring the difference between the vibration frequencies of said resonators and producing an output signal that varies in substantially linear proportion to the magnitude of said force.

* * * * *